3,069,252
METHODS FOR THE CONTROL OF THE GROWTH OF PLANTS AND PLANT PARTS
Melvin J. Josephs, Silver Spring, Md., and John L. Hardy, Midland, Mich., assignors to The Dow Chemical Company, Midland, Mich., a corporation of Delaware
No Drawing. Filed Nov. 15, 1960, Ser. No. 69,277
7 Claims. (Cl. 71—2.5)

According to the present invention, it has been discovered that the growth of plants may be controlled by exposing a viable form of a plant to the action of, or by treating plants and plant parts and their habitats with a growth-inhibiting amount of 10-thiocyanatophenoxarsine, 10,10'-thiobisphenoxarsine, 10,10'-oxybisphenoxarsine, the 10-halophenoxarsines, or the substitution products of said 10-halophenoxarsines in which said substituents are selected from chlorine and lower alkyl. Representative phenoxarsine materials include 10-chlorophenoxarsine, 10-bromophenoxarsine and 10-iodophenoxarsine as well as the chlorine and/or lower alkyl derivatives of such materials. The term lower alkyl is employed in the present specification and claims to refer to the alkyl radicals containing from 1 to 5 carbon atoms, inclusive. More particularly, it has been discovered that these phenoxarsine materials are very toxic to aquatic plants when introduced in growth inhibiting concentrations in the water environing the plants. It has been further discovered that the phenoxarsine materials are very toxic to fungal plants and of lower toxicity to terrestrial plants, and may be applied to fungal organisms or their habitats in fungicidal amounts to obtain excellent controls of many fungal organisms which attack the seeds, roots or above ground or aerial portions of terrestrial plants. Such practice protects the desirable plants or their seeds from the ravages of plant attacking fungi and improves the crop yield as well as the emergence and growth of seedlings without substantial injury to the crop plant or plant parts. Additionally, the compounds may be applied in dormant applications to the woody surfaces of terrestrial plants or to orchard floor surfaces to obtain excellent controls of the overwintering spores of fungi. In further operations, the compounds may be included in adhesives, soaps, cutting oils or in oil or latex paints to prevent mold and mildew, and the degradation of such products resulting from microbial attack. Also, the compounds may be distributed in textiles or cellulosic materials, or may be employed in the impregnation of wood and lumber to preserve and protect such products from the attack of the fungal agents of rot, mold, mildew and decay.

10-thiocyanatophenoxarsine, 10-halophenoxarsine and the 10,10'-thio- and oxybisphenoxarsines are characterized by the following formulae

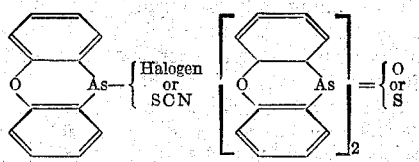

The phenoxarsine products to be employed in accordance with the present teachings are liquid or solid materials which are somewhat soluble in many common organic solvents and of low solubility in water. They are readily and conveniently adapted to be distributed in the water environing aquatic plants, to be distributed in the soil or on the above ground portions of terrestrial plants, or to be incorporated in adhesives, detergents, cutting oils, paints, textiles, paper or wood and wood products. When so distributed and employed, they give quick and excellent controls of aquatic and fungal plants and protect the products in which they are incorporated from attack and degradation by the organisms of mildew, rot and mold. It is an advantage of the present invention, that the phenoxarsine compounds accomplish a quick kill of the stem and leaf portions of aquatic plants accompanied by the control in a short period of time of the roots. Another advantage is the ability of the compounds to kill a wide variety of aquatic plants. It is a further advantage that the compounds are of low toxicity to terrestrial plants, and may be employed to control the fungi attacking said plants without significant injury to the plants. An additional advantage is that a single application of the compounds to the foliage of terrestrial plants will give a residual and extended control of fungi over a substantial period.

The treatment of plants and plant parts and their habitats with amounts of the phenoxarsine materials effective to inhibit the growth of plants and plant parts is critical and essential for the practice of the present invention. In general, good controls of aquatic plants are obtained when the phenoxarsine compounds are supplied in the water environing the plants in the amount of from 0.05 to 200 parts or more by weight per million parts by weight of the environing medium. The exact dosage to be employed is dependent upon the plant mass to be treated and whether or not the exposure is carried out in a moving stream such as a canal or in standing water such as a pond. In standing water, good results are obtained when employing minimal dosages of the compounds. In moving streams, somewhat higher concentrations are required in order to provide for the contacting of the aquatic vegetation with a growth inhibiting and herbicidal amount of the phenoxarsine compounds.

Good controls of fungal organisms are obtained when the phenoxarsine compounds are applied to the above-ground surfaces of terrestrial plants at a dosage of from 0.02 to 3 pounds per acre. In applications to soil for the control of root-attacking fungi, good results are obtained when the phenoxarsine compounds are supplied in the soil in the amount of from about 2 to 15 parts by weight per million parts by weight of soil. In applications to soil, good results are obtained when the phenoxarsine compounds are distributed at a rate of from about 0.5 to 15 pounds or more per acre and through such a cross-section of the soil as to provide for the presence therein of an effective concentration of the treating agent. In general field applications, it is usually preferred that the compounds be distributed to a depth of at least 2 inches below the soil surface. Oftentimes, it is desirable to distribute the compounds to a depth of about two feet to avoid reinfestation of the soil from deep dwelling fungal organisms. In applications to the furrow seed rows for the suppression of seedling diseases, it is desirable that the compounds be distributed upon the surfaces of the furrow at a dosage of at least 0.5 pound per acre of furrow soil surface. After such treatment, the furrow is seeded and the soil compacted about the seed according to conventional practice. If desired, the phenoxarsine materials may be distributed in the soil in amounts up to 200 parts or more per million, or on the foliage of plants in amounts up to 200 pounds per acre to control the growth of seeds and many narrow and broad leafed plant species. In the row treatment of existing vegetation, the products may be employed with known side dressing techniques.

In the protection and preservation of adhesives, detergents, cutting oils, paints, textiles and paper, good results are obtained when the compounds are incorporated in such products in the amount of at least 0.005 percent by weight. In the preservation of wood, excellent results are obtained when the compounds are incorporated by conventional treatment in the wood in the amount of at least 0.02 pound per cubic foot of wood.

The method of the present invention may be carried out by treating the plants and plant parts and their habitats with a growth inhibiting amount of the unmodified agents, or by exposing the plants and plant parts to the growth inhibiting action of such agents. In such operations, the unmodified compounds are distributed or incorporated in a growth inhibiting amount in adhesives, cutting oils, paints, textiles, paper, lumber, wood products or growth media, or upon the surfaces of the above ground portion of plants, or in the water environing aquatic plants. However, the present method also embraces the employment of liquid or dust compositions containing the toxicants. In such usage, the compounds are modified with one or a plurality of additaments or adjuvants including water, organic solvents, petroleum oils, petroleum distillates, naphthas or other liquid carriers, surface active dispersing agents and finely divided inert solids. Depending upon the concentration of toxicant, such augmented compositions are adapted to be distributed in adhesives, cutting oils, paints, textiles, paper, lumber or soil, or upon the above ground surfaces of plants, or in the water adjacent to aquatic plants, or to be employed as concentrations and subsequently diluted with additional liquid or solid carriers to produce the ultimate treating compositions.

The exact concentration of the phenoxarsine toxicants to be employed in the treating compositions is not critical and may vary considerably provided the required dosage of the effective agent is supplied in the adhesive, cutting oil, paint, textile, paper, wood or growth medium, in the water environing aquatic plants, or upon plant foliage. The concentration of toxicant in liquid compositions generally is from about 0.005 to 50 percent by weight. Concentrations up to 95 percent by weight are oftentimes conveniently employed. In dusts the concentration of the toxicant may be from about 0.1 to 95 percent by weight. In compositions to be employed as concentrates, the toxicants may be present in a concentration of from 5 to 98 percent by weight. The quantity of treating composition to be applied to textiles, lumber or growth media or the foliage of plants may vary considerably provided that the required dosage of active ingredient is applied in sufficient amounts of the finished composition to cover adequately the vegetation to be treated or to facilitate the penetration and distribution of said ingredients in and on textiles, lumber or growth media. The required amount of active ingredients in the soil conveniently may be supplied per acre treated in from about 10 to 27,000 gallons or more of liquid carrier or in from about 50 to 2,000 pounds of the inert solid carrier. In the treatment of seedling plants, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above ground portions of the vegetation. In the application of dusts to plant foliage, good results are obtained with from 40 to 200 pounds of finished dust per acre, the only requirement being that the required toxicant dosage be supplied in sufficient dust to achieve good coverage of the foliage.

In the treatment of lumber from about 1 to 3 gallons of solvent composition is usually applied per thousand square feet of surface to be treated. In the pressure or vacuum treatment of lumber, sufficient composition is employed adequately to impregnate the wood.

Liquid compositions containing the desired amount of active ingredient may be prepared by dissolving the phenoxarsine compounds in an organic liquid carrier or by dispersing the materials in water with the aid of a suitable surface active dispersing agent, such as an ionic or non-ionic emulsifying agent. The aqueous compositions may contain one or more water immiscible solvents for the phenoxarsine compounds. In such compositions, the carrier comprises an equeous emulsion, i.e., a mixture of water immiscible solvents, emulsifying agent and water. The choice of dispersing or emulsifying agent and the amount thereof employed is dictated by the nature of the composition type and by the ability of the agent to facilitate the dispersion of the active compounds in the liquid carrier to produce the desired composition. Surface active agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. The aqueous emulsion compositions may be characterized by a density slightly greater than water and contain sufficient surface active agent to make the composition self-dispersing in water to give a milky dispersion which thereafter breaks to permit settling out of a solution of the phenoxarsine material.

In the preparation of dust compositions, the active ingredient is dispersed in and on a finely divided inert solid such as clay, talc, chalk, gypsum and the like. In such operations, the finely divided carrier is mechanically mixed or ground with the phenoxarsine material. Similarly, dust compositions containing the active compounds may be prepared from various of the solid surface active dispersing agents such as bentonite, fuller's earth, attapulgite and other clays. Depending upon the proportion of ingredients, these dust compositions may be employed as concentrates and subsequently diluted with additional solid surfaces active dispersing agent, or with chalk, talc or gypsum and the like to obtain the desired amount of active ingredient in a composition adapted to be employed for the control of the growth of aquatic and fungal plants. Also, such dust compositions may be dispersed in water with or without the aid of a dispersing agent to form spray mixtures.

For aquatic vegetation control, a growth inhibiting amount of the phenoxarsine compounds is dispersed in the water adjpacent to and environing the submerged portions of the plants in a pond, lake, river, canal, stream, ditch or other water courses. This is readily accomplished by introducing the compounds or a composition containing the compounds into water above a plant mass so as to permit its dispersion in the water adjacent the growing plants. The introduction of the active materials into the water environing aquatic weeds may be accomplished by spraying or sprinkling the compositions onto or beneath the surface of the water or by metering the copositions into the vortex of a rapidly turning propeller to obtain maximum distribution of the compound in the water.

In moving water courses, water flow may be employed to distribute the phenoxarsine compounds. Thus, the compounds may be introduced into the water in such a way that they are distributed into and over the plant growth area for a sufficient time of exposure to kill the plants.

Growth inhibiting and fungicidal amounts of the phenoxarsine compounds may be dispersed in adhesives, cutting oils, paints, textiles, paper, wood, soil or growth media in any convenient fashion. Applications to growth media may be carried out by simply mixing with the media, by applying to the surface of soil and thereafter dragging or discing into the soil to the desired depth, or by employing a liquid carrier to accomplish the penetration and impregnation. The application of spray and dust compositions to the surface of soil or to the above ground surfaces of terrestrial plants may be carried out by conventional method, e.g., power dusters, boom and hand sprayers and spray dusters.

In a further embodiment, the distribution of the phenoxarsine compounds in soil may be accomplished by introducing the materials in the water employed to irrigate the soil. In such procedures, the amount of water may be varied with the porosity and water holding capacity of the soil to obtain the desired depth of distribution of the active materials.

The following examples merely illustrate the invention and are not to be construed as limiting:

Example 1

In a representative operation, 0.4 part by weight of 10-chlorophenoxarsine, 10 parts of an acetone solution containing 0.1 percent by weight of a dimeric alkylated aryl poly ether alcohol (Triton X–155) in 90 parts of water are mixed together to provide a liquid water dispersible concentrate. This concentrate is further diluted with water to prepare aqueous compositions containing 10, 5, 2 and 1 parts by weight of active ingredient per million parts of water. These compositions are employed for the treatment of Cabomba caroliniana (cabomba), Ceratophyllum spp. (coontail), Salvinia rotundifolia (salvinia) Lysimastrum nummularia (moneywort) and Anacharis spp. (water weed), growing in a series of small tanks. In such operations, the aqueous compositions are poured into the tanks to expose the plants to concentrations of 10, 5, 2 and 1 parts by weight of 10-chlorophenoxarsine per million parts of water. Other tanks containing the named plant species are left untreated to serve as checks.

At regular intervals, observations are carried out to ascertain what control of growth has been obtained. Three weeks following the treating operations, the observations show the controls of the growth of the named plant species as set forth in the following table:

| Parts by weight of 10-chlorophenoxarsine per million parts of water | Percent kill of named plant species at indicated concentration | | | | |
|---|---|---|---|---|---|
| | Cabomba | Salvinia | Moneywort | Water weed | Coontail |
| 10 | 100 | 100 | 100 | 100 | 100 |
| 5 | 100 | 100 | 100 | 100 | 100 |
| 2 | 100 | 100 | 98 | 100 | 100 |
| 1 | 100 | 100 | 98 | 100 | 100 |

At the time of observation, the untreated check tanks are found to support luxurious and succulent growth of the named plant species.

Example 2

45 Parts by weight of 10,10′-oxybisphenoxarsine, 1-chloro-10-bromophenoxarsine, 3-butyl-10-bromophenoxarsine or 4,10-dichlorophenoxarsine are mixed and ground with 5 parts by weight of Triton X–155 to prepare water dispersible concentrate compositions containing 90 percent by weight of one of the phenoxarsine materials.

In a further operation, 25 parts by weight of 2-methyl-10-chlorophenoxarsine, 2,8-dimethyl-10-chlorophenoxarsine, 2-methyl-4,10-dichlorophenoxarsine, 2,8-diamyl-10-bromophenoxarsine or 2-propyl-10-iodophenoxarsine, 10 parts by weight of Triton X–155 and 65 parts by weight of xylene are mixed together to prepare emulsifiable concentrate compositions containing 25 percent by weight of one of the phenoxarsine compounds.

In a similar manner, 25 parts by weight of 10-chlorophenoxarsine 2,4-dichloro-10-iodophenoxarsine or 2-ethyl-8,10-dichlorophenoxarsine, 71 parts of fuller's earth, 2 parts of an alkyl aryl sulfonate (Nacconol NR) and 2 parts of a polymerized sodium salt of a substituted benzoid alkyl sulfonic acid (Daxad No. 27) are mechanically mixed and ground together to prepare a concentrate in the form of a wettable powder and contain 25 percent by weight of one of the phenoxarsine compounds.

A mixture of 20 parts by weight of 10,10′-oxybisphenoxarsine, 0.1 part of Nacconol NR, 0.1 part of Daxad No. 27 and 200 parts of water are ball milled together to prepare a water dispersible liquid concentrate composition.

These concentrate compositions are aqueous dispersions thereof in a small quantity of water are adapted to be employed to distribute growth inhibiting amounts of the phenoxarsine compounds in water adjacent to aquatic weeds. The concentrate compositions may be dispersed in water to prepare aqueous compositions which have very desirable wetting and penetrating properties, and are adapted to distribute growth inhibiting or fungicidal amounts of the phenoxarsine compounds in soil, or upon the above ground portions of terrestrial plants.

Example 3

In a further operation, concentrate compositions are prepared in the manner as described in Example 1 from various phenoxarsine compounds, and the concentrates dispersed in water to produce aqueous compositions containing 10 parts per million by weight of active agent. These compositions are employed exactly as described in Example 1 for the control of the growth of Cabomba caroliniana (cabomba), Ceratophyllum spp. (coontail), Salvinia rotundifolia (salvinia), Lysimastrum nummularia (moneywort) and Anacharis spp. (water weed). The results obtained in these operations are set forth in the following table:

| Test compound | Percent control of named plant species | | | | |
|---|---|---|---|---|---|
| | Cabomba | Salvinia | Moneywort | Water weed | Coontail |
| 10-bromophenoxarsine | 100 | 100 | 100 | 100 | 100 |
| 10-iodophenoxarsine | 100 | 100 | 100 | 100 | 100 |
| 1,3,10-trichlorophenoxarsine | 100 | 100 | 100 | 100 | 100 |
| 2,6,10-trichlorophenoxarsine | 100 | 100 | 100 | 100 | 100 |
| 2,8,10-trichlorophenoxarsine | 100 | 100 | 100 | 100 | 100 |
| 1,2,4,10-tetrachlorophenoxarsine | 100 | 100 | 100 | 100 | 100 |
| 10,10′-oxybisphenoxarsine | 100 | 100 | 100 | 100 | 100 |
| 10-thiocyanatophenoxarsine | 100 | 100 | 100 | 100 | 100 |

At the time of the observations, the untreated check tanks are found to support luxurious and succulent growth of the named plant species.

Example 4

Acetone solutions containing 6 grams of various phenoxarsine compounds per liter are employed for the treatment of a sandy loam soil heavily infested with the organisms Fusarium oxysporum lycopersici and Rhizoctonia solani. In the treating operations, the soil is placed in sealable containers and separately injected with the acetone compositions in an amount sufficient to supply 10 parts by weight of one of the phenoxarsine compounds per million parts by weight of soil. Following the treatment, the containers are sealed and the soil therein mixed to insure uniform distribution of the treating composition. After mixing, the containers of treated soil are incubated at an average temperature of 25° C. In a check operation, sealed containers containing the same infested but untreated soil are exposed to identical conditions as the treated soil.

After three days, the containers are opened and portions of the treated and untreated soil cultured by the dilution plate method as described by J. P. Martin in "Soil Science" 69, No. 3, pp. 215–32 (March 1950) to determine the percent control of fungus organisms. In the latter operations, the culturing medium employed is a peptone dextrose agar (1000 milliliters of water, 10 grams of dextrose, 5 grams of peptone, 1 gram of $KH_2PO_4$, 0.5 gram of $MgSO_4 7H_2O$ and 20 grams of agar) containing 0.069 gram of rose bengal and 0.030 gram of streptomycin per liter of ultimate mixture. In the plating operations, the culturing medium is incorporated with about 0.5 gram of soil sample per liter of medium and the plates thereafter poured in replicates of three for the treated and check soils. The poured plates are then incubated for three days at 25° C.

After incubation, the plates are examined and counts of fungus colonies made in order to determine the percent control of fungus organisms. The phenoxarsine compounds employed and the results obtained in the described operations are set forth in the following table:

| Test compound | Percent kill of named fungal organism | |
|---|---|---|
| | Fusarium oxysporum lycopersici | Rhizoctonia solani |
| 10-chlorophenoxarsine | 100 | 100 |
| 10-iodophenoxarsine | 100 | 100 |
| 10-bromophenoxarsine | 100 | 100 |
| 1,3,10-trichlorophenoxarsine | 100 | 100 |
| 2,6,10-trichlorophenoxarsine | 100 | 100 |
| 2,8,10-trichlorophenoxarsine | 100 | 100 |
| 1,2,4,10-tetrachlorophenoxarsine | 100 | 100 |
| 2-tertiarybutyl-10-chlorophenoxarsine | 100 | 100 |
| 10,10'-thiobisphenoxarsine | 85 | 85 |
| 10,10'-oxybisphenoxarsine | 100 | 100 |
| 10-thiocyanatophenoxarsine | 100 | 100 |

At the time of the observations, the plates from the untreated check soil are found to support the growth of numerous colonies of the named fungal organisms.

*Example 5*

0.05 part by weight of various phenoxarsine materials, 0.05 part of Nacconol NR, 0.05 part of Daxad No. 27 and 500 parts of water are ballmilled together to produce concentrate compositions, and the concentrates thereafter dispersed in water to produce aqueous compositions containing 10 parts by weight of one of the phenoxarsine materials. These compositions are sprayed with an atomizing spray nozzle using air pressure at 20 pounds per square inch on young tomato plants about 4 inches tall. The applications are carried out so as to give thorough coverage of all surfaces of the leaves of the plants without appreciable run-off. Following the applications, the spray compositions are allowed to dry upon the leaf surfaces and the plants then inoculated by spraying with a suspension of viable spores of *Alternaria solani*. Untreated tomato plants of the same maturity are similarly inoculated to serve as checks. Immediately following the inoculation, all plants were placed in a moist chamber and maintained at 70° F. under saturated humidity conditions for 24 hours. Thereafter, the plants are set aside under greenhouse conditions for 48 hours and then observed for the development of the lesions of tomato early blight caused by the Alternaria organisms to determine the percent kill of this organism. The phenoxarsine compounds together with the results obtained therewith in the described operations are set forth in the following table.

Test compound: Percent kill and control of *Alternaria solani* (tomato early blight)
- 10-chlorophenoxarsine _____ 100
- 10-bromophenoxarsine _____ 100
- 1,3,10-trichlorophenoxarsine _____ 100
- 2,6,10-trichlorophenoxarsine _____ 100
- 1,2,4,10-tetrachlorophenoxarsine _____ 100
- 10,10'-oxybisphenoxarsine _____ 100
- 2-tertiarybutyl-10-chlorophenoxarsine ___ 100
- 10-thiocyanatophenoxarsine _____ 100

At the time of the observations, the leaves of the untreated check plants are found to be covered with the lesions of tomato early blight.

*Example 6*

Various phenoxarsine materials are dispersed in water to prepare aqueous compositions containing one part of one of the phenoxarsine compounds per million parts by weight of ultimate mixture. These compositions were employed for the control of an alga, *Chlorella vulgaris*. In such operations, *Chlorella vulgaris* is contacted with the aqueous compositions and thereafter observed at regular intervals to ascertain what percent control of growth has been obtained. The phenoxarsine compounds employed and the results observed after twenty days are set forth in the following table.

Test compound: Percent kill of *Chlorella vulgaris*
- 10-chlorophenoxarsine _____ 100
- 2-tert.butyl-10-chlorophenoxarsine _____ 90
- 2-methyl-10-chlorophenoxarsine _____ 100
- 2-methyl-8,10-dichlorophenoxarsine _____ 100
- 10-iodophenoxarsine _____ 100
- 1,3,10-trichlorophenoxarsine _____ 90
- 2,6,10-trichlorophenoxarsine _____ 100
- 2,8,10-trichlorophenoxarsine _____ 90
- 1,2,4,10-tetrachlorophenoxarsine _____ 80
- 10,10'-oxybisphenoxarsine _____ 100
- 10,10'-thiobisphenoxarsine _____ 80

*Example 7*

Various phenoxarsine compounds are employed for the control of the slime producing organisms, *Aspergillus terreus*, *Penicillium chryogenum* and *Candida pelliculosa*. In such operations, the phenoxarsine materials are dispersed in aqueous suspensions containing 0.5 percent by weight of finely ground woodpulp to produce compositions containing 0.0005 gram of one of the phenoxarsine compounds per 100 millilters of aqueous composition. These compositions are thereafter inoculated with the named slime producing organisms and thereafter incubated for 24 hours at about 30° C. In a check operation, unmodified aqueous pulp suspensions are inoculated and incubated in the same fashion.

Following the incubation period, the suspensions are cultured on nutrient agar and the subcultures incubated for 48 hours at 30° C. After this period, the subcultures are examined in order to determine the percent kill of the slime producing organisms. The phenoxarsine compounds employed and the results obtained in the described operations are set forth in the following table.

Test compound: Percent kill of the named plant organisms
- 10-chlorophenoxarsine _____ 100
- 10-bromophenoxarsine _____ 100
- 10-iodophenoxarsine _____ 100
- 10-thiocyanatophenoxarsine _____ 100

At the time of the observations, the subcultures from the unmodified check suspensions were found to be heavily overgrown with the named slime producing organism.

*Example 8*

Various of the phenoxarsine materials are employed as preservatives in cutting oil emulsions to protect such emulsions from degradation and attack by the organisms of mold and mildew. In such operations, the phenoxarsine compounds are dispersed in aqueous cutting oil emulsions containing one part by volume of cutting oil per 40 parts of aqueous emulsion to produce emulsion compositions containing 0.05 percent by weight of one of the phenoxarsine compounds. The oil employed is a typical commercial cutting oil consisting essentially of light mineral oil, an organic emulsifier and an aliphatic alcohol coupling agent. These treated compositions are then heavily inoculated with a cutting oil emulsion which is heavily contaminated with the plant organisms of mold and mildew following industrial use. In a check operation, aqueous cutting oil suspensions untreated with the phenoxarsine materials are similarly inoculated.

After 7 days, the suspensions are subcultured on nutrient agar and the subcultures incubated for 48 hours at 30° C. Following the incubation period, the subcultures are examined in order to determine the percent kill of bacterial organisms. The phenoxarsine compounds employed and the results obtained in the described operations are set forth in the following table.

| Test compound: | Percent kill of the organisms of mold and mildew |
|---|---|
| 2,6,10-trichlorophenoxarsine | 100 |
| 2,8,10-trichlorophenoxarsine | 100 |
| 1,3,10-trichlorophenoxarsine | 100 |
| 2,6,10-trichlorophenoxarsine | 100 |
| 10,10'-oxybisphenoxarsine | 100 |
| 10-chlorophenoxarsine | 100 |
| 10-bromophenoxarsine | 100 |
| 10-thiocyanatophenoxarsine | 100 |

At the time of the observations, the subcultures from the untreated check suspensions are found to support a very heavy growth of the organisms of mold and mildew.

Example 9

Various phenoxarsine compounds are employed in paint compositions to protect the paints from degradation and attack by the organisms of mold and mildew. In such operations, the phenoxarsine compounds are dispersed and incorporated in latex paint samples in the amount of 1 percent by weight of the ultimate paint compositions.

The paint employed in these operations is prepared by intimately blending a pigment dispersion with a letdown including a synthetic latex comprising an interpolymer of ethyl acrylate, methyl methacrylate, acrylic acid, and methacrylic acid. The paint employed has the following composition.

| Pigment dispersion: | Approximate pounds per 100 gallons |
|---|---|
| Water | 140 |
| Potassium tripolyphosphate | 1.5 |
| Titanium dioxide | 240 |
| Mica (325 mesh) | 50 |
| Calcium carbonate | 20 |
| Clay (finely ground) | 20 |
| polypropylene glycol (molecular weight 1,200) | 4 |
| Let down— | |
| Methyl cellulose | 150 |
| Synthetic latex | 506 |
| Anti-foam agent | 10 |

Wood panels are then painted with the modified paint compositions as well as with unmodified paint. The panels are dried and thereafter exposed two months in a tropical chamber at a relative humidity of 95 percent and a temperature of 82° F. Following this period, the wood panels are examined to ascertain what control of the plant growth is obtained. The compounds employed and the results obtained are set forth in the following table.

| Test compound: | Percent control of the organisms of mold and mildew |
|---|---|
| 10-chlorophenoxarsine | 100 |
| 10-bromophenoxarsine | 100 |
| 10,10'-oxybisphenoxarsine | 100 |
| 10-thiocyanatophenoxarsine | 100 |

At the time of the observations, the check panels painted with unmodified paint composition are found to support a heavy growth of the organisms of mold and mildew covering approximately 75 percent of the painted surfaces.

Example 10

In a further operation, 10-chlorophenoxarsine, 10-bromophenoxarsine, 10-iodophenoxarsine, 10,10'-oxybisphenoxarsine, 10,10'-thiobisphenoxarsine and 10-thiocyanatophenoxarsine are dispersed in melted nutrient agar to produce culture media containing 0.005 percent by weight of one of the phenoxarsine compounds. Such melted media are then poured into petri dishes and the solidified agar surfaces in each petri dish inoculated with one of the organisms *Erwinia carotovora, Aspergillus terreus, Pullularia pullulans, Penicillium digitatum* and *Rhizopus nigricans*. In such operations, the inoculation is carried out by mopping the agar surfaces with a swab from a 24-hour broth culture of the organism. In a check operation, petri dishes containing unmodified nutrient agar were each individually inoculated in the same manner with the named organisms. After two days incubation at about 35° C., the agar surface in each dish is examined for microorganisms. The examination shows that the agar surfaces in the petri dishes containing 0.005 percent by weight of one of the phenoxarsine materials are entirely free of microbial growth. At the time of these observations, the check petri dishes containing the unmodified agar are found to support a heavy growth of the five named test organisms.

Example 11

10-chlorophenoxarsine and 10,10'-oxybisphenoxarsine are employed for the treatment of wood to protect the wood from the degradation and attack of the organisms of rot, decay and mildew. In such operations, wood blocks are treated under vacuum with a five percent solution of the compounds in aromatic naptha to impregnate the wood in the amount of 0.4 pound of one of the phenoxarsine compounds per cubic foot of wood.

The treated blocks and untreated check blocks are then weathered in field soil and under tropical conditions for one year. After such exposure, the treated blocks are found to be free from the attack of the organisms of rot, decay and mildew. At the time of the observations, the untreated blocks are found to support a heavy growth of the complex of the organisms of rot and decay.

The term "plant part" as employed in the present specification and claims is intended to be inclusive of the spores, hyphae, mycelia, stems, branches, roots, foliage and germinant seeds of plants. The expression "growth media and soil" are herein employed in their broadest sense to be inclusive of all conventional "soils" as defined in Webster's New International Dictionary, second edition, unabridged, published in 1937 by G. and C. Merriam Company, Springfield, Massachusetts. Thus the terms refer to any substance or media in which vegetation may take root and grow, and are intended to include not only earth but compost, manure, muck, humus, and sand and the like, adapted to support plant growth.

10-chlorophenoxarsine and the substituted 10-chlorophenoxarsine compounds as employed in accordance with the present teachings may be prepared in known procedures from 2-nitrodiphenyl ether or a suitably substituted 2-nitrodiphenyl ether. The substituted ethers to be employed are those having chlorine and/or alkyl substituted on the ring moieties and having one ortho position unsubstituted on the ring moiety unsubstituted with a nitro radical. In such procedures, the ether compound is treated with hydrochloric acid in the presence of tin or iron to reduce the nitro group to an amino group. The amino substituted ether compound is then treated with hydrochloric acid and sodium nitrite to diazotize the amino group to a diazonium chloride group, and the diazotized product treated with sodium arsenite

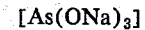

in a Bart reaction to produce the corresponding arsonate compound having an —AsO₃Na₂ group substituted for the diazonium chloride group. The arsonate derivative is then treated with hydrochloric acid and sulfur dioxide, whereby the arsonate group is reduced and chlorinated to the arsine dichloride group (—AsCl₂). This latter arsine dichloride product may then be heated at a temperature of about 200° C. and in the presence of a gaseous entraining agent such as carbon dioxide or nitrogen to bring about ring closure and the production of the desired 10-chlorophenoxarsine or substituted 10-chlorophenoxarsine. Treatment of these products with potassium bromide or potassium iodide gives the corresponding 10-halophenoxarsine or substituted 10-halophenoxarsines.

The 10,10'-oxybisphenoxarsine as employed in accordance with the present teaching may be prepared in known procedures by treating 10-chlorophenoxarsine with ammonium hydroxide in ethanol as reaction medium. The 10,10'-thiobisphenoxarsine as herein employed is also prepared by known procedures wherein 10-chlorophenoxarsine is reacted with hydrogen sulfide $H_2S$ in a solvent such as benzene.

The 10-thiocyanatophenoxarsine as employed herein is prepared by known methods wherein 10-chlorophenoxarsine is reacted with potassium thiocyanate in a mixture of acetone and water as reaction medium.

The present application is a continuation-in-part of a copending application Serial No. 17,463, filed March 25, 1960, and now abandoned.

We claim:

1. A method which comprises treating plants and plant parts and their habitats with a growth inhibiting amount of an active agent selected from the group consisting of 10-thiocyanatophenoxarsine, 10,10'-thiobisphenoxarsine, 10,10'-oxybisphenoxarsine, the 10-halophenoxarsines and the substituted 10-halophenoxarsines in which said substituents are selected from the group consisting of chlorine and lower alkyl.

2. A method claimed in claim 1 wherein the active agent is 10-chlorophenoxarsine.

3. A method claimed in claim 1 wherein the active agent is 10,10'-oxybisphenoxarsine.

4. A method claimed in claim 1 wherein the active agent is 10-thiocyanatophenoxarsine.

5. A method claimed in claim 1 wherein the active agent is 10-iodophenoxarsine.

6. A method claimed in claim 1 wherein the active agent is 10-bromophenoxarsine.

7. A method claimed in claim 1 wherein the active agent is a 10-halophenoxarsine.

References Cited in the file of this patent

UNITED STATES PATENTS 2,945,856    Rickert et al. _____ July 19, 1960

OTHER REFERENCES

Mole et al.: "Chemical Abstracts," vol 34, col. 1001(2), 1940.

Rozonae et al.: "Chemical Abstracts," vol. 25, col. 1831(2), 1931.

Lewis et al.: "Chemical Abstracts," vol. 15, col. 1720–1721(L), 1921.